United States Patent
Lisenker et al.

(10) Patent No.: US 6,691,840 B1
(45) Date of Patent: Feb. 17, 2004

(54) MR DAMPER WITH REBOUND CUT-OFF FEATURE

(75) Inventors: Ilya Lisenker, Miamisburg, OH (US); Saiman Lun, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/360,684

(22) Filed: Feb. 7, 2003

(51) Int. Cl.$^7$ .................................................. F16F 9/53
(52) U.S. Cl. ..................... 188/267.1; 188/284; 188/315; 188/268; 267/64.13; 267/293; 267/221; 267/220
(58) Field of Search ................................ 188/284, 315, 188/267.1, 282.8, 268; 267/64.13, 294, 293, 221, 220, 226

(56) References Cited

U.S. PATENT DOCUMENTS

| | | | |
|---|---|---|---|
| 2,379,750 A | * 7/1945 | Rossman | 188/284 |
| 3,826,343 A | * 7/1974 | Heymann | 188/282.8 |
| 5,257,680 A | * 11/1993 | Corcoran et al. | 188/129 |
| 5,265,710 A | * 11/1993 | Gabas et al. | 192/111 A |
| 5,284,330 A | * 2/1994 | Carlson et al. | 267/140.14 |
| 5,450,931 A | * 9/1995 | Masuda et al. | 188/268 |
| 5,522,486 A | 6/1996 | Fulks et al. | 188/315 |
| 5,570,762 A | 11/1996 | Jentsch et al. | 188/322.15 |
| 5,570,763 A | 11/1996 | Parejo | 188/322.22 |
| 5,607,035 A | 3/1997 | Fulks et al. | 188/322.19 |
| 5,620,172 A | 4/1997 | Fulks et al. | 267/221 |
| 5,947,238 A | * 9/1999 | Jolly et al. | 188/267.2 |
| 6,161,662 A | 12/2000 | Johnston et al. | 188/282.3 |
| 6,378,671 B1 | * 4/2002 | Carlson | 188/267.2 |
| 6,390,253 B1 | * 5/2002 | Oliver | 188/267.2 |
| 6,394,239 B1 | * 5/2002 | Carlson | 188/267.2 |
| 6,422,361 B2 | 7/2002 | Naples et al. | 188/322.15 |
| 6,516,926 B2 | * 2/2003 | Lisenker et al. | 188/267.1 |

OTHER PUBLICATIONS

Miller et al., *Piston and Rod Assembly for Air–Actuated Variable Damping*, US 2002/0108826 A1, Publication Date Aug. 15, 2002, Filed Jan. 11, 2002.

* cited by examiner

Primary Examiner—Christopher P. Schwartz
Assistant Examiner—Devon Kramer
(74) Attorney, Agent, or Firm—Scott A. McBain

(57) ABSTRACT

A suspension damper including a tube and a damping piston assembly disposed within the tube and slidably mounted therein for reciprocal movement in the tube. The suspension damper also includes a piston rod extending through the tube and connected to the damping piston assembly, a rod guide assembly closing a top end of the tube, and a rebound cut-off disk and spring suspended in the tube between the rod guide assembly and the damping piston assembly and cooperating with the damping piston assembly to provide a rebound cut-off effect between the rebound cut-off disk and the damping piston assembly. The rebound cut-off disk and spring have specific gravities that are less than the specific gravity of the fluid in the tube, such that the disk and the spring are floatable in the fluid.

25 Claims, 1 Drawing Sheet

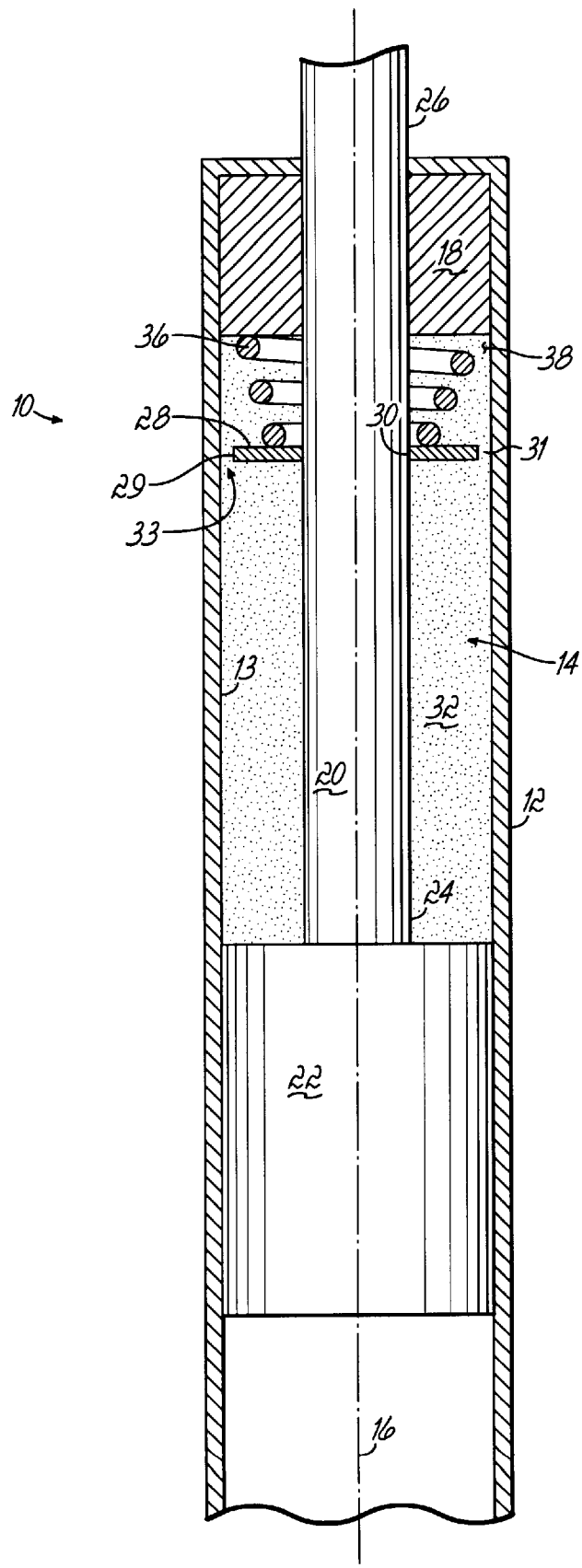

MR DAMPER WITH REBOUND CUT-OFF FEATURE

TECHNICAL FIELD

The present invention relates to a suspension damper with rebound cut-off for use in a vehicle suspension system and, more particularly, to a suspension damper with a hydraulic rebound cut-off feature that provides a hydraulically cushioned stop at an end of rebound travel in the damper.

BACKGROUND OF THE INVENTION

A damper operates in vehicle suspensions as a damping device controlling the sprung (body) and unsprung (wheels) masses of a vehicle by reducing loads or vertical accelerations normally transmitted from the wheels to the body. Damping is accomplished by converting kinetic energy into thermal energy and dissipating the heat. Conventionally, hydraulic dampers include a piston with a connected piston rod slidably carried in a fluid-filled tube and separating the tube into extension and compression chambers. A rod guide at the top end of the tube closes the extension chamber and slidably engages the piston rod. As the parts of the vehicle suspension to which the cylinder tube and piston rod are attached move relative to one another, the damping piston assembly is moved in compression and rebound strokes along the axis of the damper. The damping piston assembly includes passages, and in some dampers also special valve arrangements associated with the passages, that allow fluid in the working chamber to flow through the damping piston assembly at a controlled rate to provide damping of the relative motion between the parts of the vehicle suspension to which the damper is attached.

In many applications, the suspension damper is called upon to limit the full extension travel of the suspension system. In some prior dampers, mechanical rebound stops that are fixed to the piston rod and engageable with the rod guide are known to provide a means of limiting the maximum extension travel of the piston rod from the damper. A typical mechanical rebound stop is generally equipped with a resilient bumper made of material such as rubber or urethane. The bumper is designed to cushion the engagement of the damping piston with the rod guide at the end of damper travel in the extension direction. This type of a mechanical stop tends to result in somewhat of an abrupt means of limiting travel during rebound. It has also been found that, in severe applications, a resilient bumper material may undesirably experience heat degradation when the bumper absorbs the entire rebound stop load.

It has also been the practice in some prior hydraulic dampers to provide elements attached to the damping piston assembly and the cylinder tube that provide additional hydraulic damping force acting against the piston during a portion of the rebound stroke, for slowing the damping piston assembly as it approaches the end of the rebound stroke. This function of providing additional damping at the end of the rebound stroke, for slowing the rate of rebound, is also known as hydraulic "rebound cut-off." Examples of this approach are disclosed in U.S. Pat. No. 6,209,691 to Fehring et al. and U.S. Pat. No. 5,706,920 to Pees et al., and in British Patent No. 691,477 to Stephens.

In recent years, hydraulic dampers using a special type of fluid, known as Magneto-Rheological (MR) fluid, have been utilized as part of vehicle traction and stability enhancement control systems for actively controlling the amount of damping provided under varying road and operating conditions to provide improved performance and safe operation of vehicles. An MR fluid is generally significantly more viscous and has a higher specific gravity than the hydraulic fluids used in prior vehicle dampers. As a result, elements for providing a hydraulic rebound cut-off function in prior hydraulic dampers, or spacers attached to the damping piston assembly and/or piston rod for limiting maximum extension or speed of extension of the damper on the rebound stroke, may provide inefficient and undesirable performance in dampers using MR fluids or other fluids.

Providing a hydraulic rebound cut-off feature with a shock absorber form of damper is known. Such a device is disclosed in U.S. Pat. No. 2,379,750. That hydraulic rebound cut-off feature uses a rod guide having a collar forming an anchorage for an upper end of a coil spring whose lower end is secured to a ring valve. When the piston approaches full extension, the ring valve is contacted, which closes some fluid passages completely and others partially to reduce their fluid flow capacity, increasing damping force and slowing extension directed travel. This prior art device undesirably restricts fluid flow between the valve and the piston.

Yet another type of known hydraulic rebound cut-off feature utilizes a rebound cut-off piston in conjunction with a damping piston. Such a device is disclosed in U.S. Pat. No. 4,342,447. According to this prior art design, a fixed/clamped disk or disk stack on a secondary or rebound cut-off piston co-acts with the damping piston to effect a substantial entrapment of fluid in the extension chamber of the shock absorber as the damping piston approaches full rebound. However, in this device, an indentation in the wall acts as a piston stop and not as a support for the rebound cut-off piston.

Still another type of known hydraulic rebound cut-off feature utilizes a rebound cut-off device in conjunction with a damping piston. Such a device is disclosed in U.S. Pat. No. 5,277,284. According to this prior art design, a spring is held on the damping piston by a retaining ring on the piston rod. However, in this device, the retaining ring does not act as a support for the rebound cut-off device.

In other dampers, the rebound cut-off disk is retained by a snap ring in the wall of the tube, or is attached to the rod guide by means of a spring. However, the snap ring reduces available stroke, while the attachment is awkward and prone to failure. Still other dampers include a rebound cut-off disk that is heavier than fluid in the tube, and they are supported by a plastic float. The float requires a certain volume and, therefore, takes up valuable stroke length.

What is needed, therefore, is an improved hydraulic vehicle damper having elements for limiting maximum extension on rebound and providing rebound cut-off in a manner that allows efficient and effective use of MR fluids or other fluids.

SUMMARY OF THE INVENTION

According to the present invention, an improved hydraulic rebound cut-off feature of a suspension damper is provided. It can be added to a damper with minimal impact on damper dead length, has fewer parts, is low cost and light weight.

According to this aspect, a suspension damper includes a fluid-filled tube and a damping piston assembly disposed within the tube and slidably mounted therein for reciprocal movement in the tube. A piston rod extends through the tube and connects to the damping piston assembly, and a rod guide assembly closes a top end of the tube. The suspension damper also includes a rebound cut-off disk suspended in the tube between the rod guide assembly and the damping piston assembly. The suspension damper further includes a spring suspended in the tube between the rod guide assembly and the rebound cut-off disk. The spring and the disk have specific gravities lower than the specific gravity of the fluid in the tube and are floatably disposed within the top of the tube adjacent the rod guide assembly. Together, the spring and the rebound cutoff disk cooperate with the damping piston assembly to provide a rebound cut-off effect between the rebound cut-off disk and the damping piston assembly.

The invention may also take the form of a method for limiting the extent and/or speed of extension of the damper on the rebound stroke by having a spring and a disk floatably disposed within a tube to provide a rebound cut-off effect between the rebound cut-off disk and the damping piston assembly.

A suspension damper of the present invention incorporates a hydraulic rebound cut-off feature. As a result, a suspension damper of the present invention is light weight, has fewer parts, and is relatively low cost. The rebound cut-off effect results in the full damper area having a very high force, yet the compressing loads are essentially zero.

Other features and advantages of the present invention will be readily appreciated as the same becomes better understood after reading the subsequent description, when considered in connection with the accompanying drawings.

BRIEF DESCRIPTION OF THE DRAWINGS

The present invention will now be described, by way of example, with reference to the accompanying drawings, in which:

FIG. 1 is a schematic cross-section of a suspension damper of the present invention.

DETAILED DESCRIPTION

FIG. 1 depicts an exemplary embodiment of a suspension damper 10, according to the present invention, having a cylinder tube 12 defining a working chamber 14 for containing a fluid therein, and defining an axis 16. A rod guide assembly 18 closes a top end of the cylinder tube 12, and is adapted for receiving and guiding a piston rod 20, and for providing a sliding fluid seal between the piston rod 20 and the cylinder tube 12.

A damping piston assembly 22 is slidably disposed in the working chamber 14 for reciprocating motion along the axis 16. The piston rod 20 has a first end 24 and a second end 26. The first end 24 of the piston rod 20 is connected to the damping piston assembly 22, for linear movement of the piston rod 20 and damping piston assembly 22 within the working chamber 14, along the axis 16. The second end 26 of the piston rod 20 extends along the axis 16, through the rod guide assembly 18, and out of the working chamber 14.

Those having skill in the art will recognize that the components described thus far, in relation to FIG. 1, would further include a number of features known in the art, such as fluid passages and valve components in the damping piston assembly, for example, that have been omitted from this explanation for clarity. We contemplate, however, that our invention may be practiced in forms incorporating such features known to those having skill in the art.

The damper 10 of FIG. 1 further includes a rebound cut-off feature, in the form of a disk 28 having a central bore 30 therein, whereby the disk 28 is disposed about the piston rod 20 between the damping piston assembly 22 and the rod guide 18 for sliding motion of the disk 28 within the cylinder tube 12 and along the piston rod 20. The cylinder tube 12 defines an inner surface 13 thereof, and the disk 28 defines an outer surface 29 thereof adjacent to the inner surface 13 of the cylinder tube 12. The outer surface 29 is spaced from the inner surface 13 of the cylinder tube 12 to form a small gap 31 between the cylinder tube 12 and the disk 28, thereby defining a generally annular-shaped restriction in the fluid passage 33, in conjunction with the inner wall 13 of the cylindrical tube 12. The axial length and outer periphery of the rebound cut-off disk 28 can be closely controlled and matched to the inner wall 13 of the cylinder tube 12 to accurately and conveniently control the effective flow characteristics of the fluid passage 33, and facilitate tuning of the damper 10 to meet desired performance parameters for rebound cut-off operation.

The working chamber 14 includes a volume of fluid 32 having a specific gravity. The disk 28 is configured in such a manner that the specific gravity of the disk 28 is less than the specific gravity of the fluid, so that the disk 28 floats in the fluid 32 toward the top end of the working chamber 14, adjacent the rod guide assembly 18, during normal operation of the damper 10.

In the first exemplary embodiment, shown in FIG. 1, the fluid 32 is a Magneto-Rheological (MR) fluid, but other fluids such as oil are also contemplated. The disk 28 is fabricated as a solid circular disk, having a specific gravity less than that of the fluid. In an exemplary embodiment, the disk is made of metal, and is over-molded with a plastic material or elastomeric material, such as nylon, such that the average density of the resulting component is less than that of the fluid 32. The disk may also be hollow to provide buoyancy. Such materials are robust enough to absorb the physical loads imposed on the disk 28 in arresting the motion of the damping piston assembly 22, and light enough to float in the fluid 32. It may be understood, however, that the materials for the disk 28 may be varied depending on the type of fluid 32 used in the working chamber 14, whether an MR fluid or other type of fluid.

Because the disk 28, in a damper 10 according to the present invention, floats in the fluid 32 at the top of the working chamber 14, away from the damping piston assembly 22, rather than having a spacer attached to the damping piston assembly or piston rod as in prior dampers, the fluid 32 does not need to flow around the disk 28 during normal, i.e., non-maximum, extension of the damper 10. This allows the gap 31 between the disk 28 and the cylinder tube 12 to be smaller than would be the case in prior dampers, even when using highly viscous MR fluids.

Having a small gap 31 between the cylinder tube 12 and the disk 28 results in a tighter fit between the cylinder tube 12 and the disk 28 that is conducive to reducing operational noise of the damper 10, such as rattling of the disk 28 in the cylinder tube 12. Having the disk 28 float in the working chamber 14 away from the damping piston 22 also contributes to reducing operational noise.

The damper 10 of FIG. 1 further includes a conical compression spring 36. The working chamber 14 includes a volume of fluid 32 having a specific gravity. The spring 36 is configured in such a manner that the specific gravity of the spring 36 is less than the specific gravity of the fluid, so that the spring 36 floats in the fluid 32 at the top end of the working chamber 14, adjacent the rod guide assembly 18, during normal operation of the damper 10. The spring 36 is disposed between the rod guide assembly 18 and the disk 28 for holding the disk 28 away from the rod guide assembly 18, and forming a small reservoir 38 of fluid 32 between the rod guide 18 and disk 28. The spring 36 may be fabricated from a metal tube having its ends sealed by welding, or any other similar method. The interior of the metal tube may also be filled, and thus sealed, by injecting it with a plastic or elastomeric material. The spring may alternatively be injection-molded from a fiber-reinforced plastic material, for example. Further, the fiber is advantageously of sufficient length such that the fiber aligns itself along the flow direction of the plastic material. The uni-axial orientation of the fibers provides improved material properties in the direction of loading.

As discussed above, the gap 31 between the cylinder tube 12 and the disk 28 defines a passage 33, which permits fluid flow between the disk 28 and the inner surface 13 of the cylinder tube 12 for filling and emptying the small reservoir 38 created by the spring 36 between the disk 28 and the rod guide assembly 18.

The material and configuration of the disk 28, spring 36, and fluid 32 are selected to have respective specific gravities that result in the disk 28 and spring 36 being floatable in the fluid 32 at the upper end of the working chamber 14.

In another embodiment of the present invention, the disk 28 has a specific gravity sufficiently less than the specific gravity of the fluid 32 such that the disk 28 and the spring 36 will float in the fluid 32. Thus, in this embodiment, the specific gravity of the spring 36 does not necessarily have to be less than that of the fluid 32, and may in fact, be equal to or greater than that of the fluid.

During normal, i.e., non-rebound-cut-off, operation of the damper 10, the damping piston assembly 22 is free to move independently from the disk 28 and its related components, as the piston rod 20 moves in and out of the cylinder tube 12 in response to the motion of the vehicle suspension. As the damper 10 approaches a maximum extended position on the rebound stroke of the damper 10, the damping piston assembly 22 is brought to bear against the disk 28.

Further motion of the damping piston assembly 22 on the rebound stroke, after the damping piston assembly 22 contacts the disk 28, forces the disk 28 to move upward, compressing the spring 36 such that the coil of the spring nest inside each other, due to the conical configuration, thereby having a minimum collapsed length of about one wire diameter. The compression of the spring 36 forces fluid trapped above the disk 28 in the small reservoir 38 to flow through the passage 33 past the rebound cut-off disk 28 in a controlled manner that generates additional damping which resists and slows the damping piston assembly 22 to thereby provide a hydraulic rebound cut-off function that reduces impact of the damping piston 22 against the rod guide 18. Once the spring's 36 compression is maximized, rebound cut-off operation ceases and the disk 28 functions as a spacer, preventing further extension of the damper 10 during the rebound stroke.

Following rebound cut-off operation, the spring 36 forces the disk 28 away from the rod guide 18, as the damping piston assembly 22 moves downward along the axis 16 on the compression stroke of the damper 10. As the disk 28 moves away from the rod guide 18, fluid 32 in the working chamber 14 flows through the passage 33 and past the disk 28 to refill the small reservoir 38.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicant's general inventive concept.

What is claimed is:

1. A suspension damper comprising:
   a tube;
   a rod guide assembly closing one end of the tube;
   a damping piston assembly disposed within the tube and slidably mounted therein for reciprocal movement in the tube, wherein the tube is substantially filled with a fluid having a specific gravity that damps the reciprocating movement of the damping piston assembly within the tube;
   a piston rod connected to the damping piston assembly and extending through the tube and the rod guide assembly;
   a rebound cut-off disk suspended in the tube between the rod guide assembly and the damping piston assembly and cooperating with the damping piston assembly to provide a rebound cut-off effect between the rebound cut-off disk and damping piston assembly; and
   a spring disposed between the rebound cut-off disk and the rod guide assembly,
   wherein the disk that has a specific gravity that is less than the specific gravity of the fluid, whereby the disk is floatable in the fluid.

2. The suspension damper of claim 1 wherein the spring has a specific gravity that is less than the specific gravity of the fluid, whereby the spring is floatable in the fluid.

3. The suspension damper of claim 1 wherein the fluid is a magneto-rheological (MR) fluid.

4. The suspension damper of claim 1 wherein the fluid is oil.

5. The suspension damper of claim 1 wherein the disk comprises metal overmolded with a plastic material.

6. The suspension damper of claim 1 wherein the disk comprises metal overmolded with an elastomeric material.

7. The suspension damper of claim 1 wherein the spring is conical in shape and the coils of the spring nest within each other, thereby having a minimum collapsed length of about one wire diameter.

8. The suspension damper of claim 1 wherein the spring comprises a metal tube.

9. The suspension damper of claim 8 wherein the ends of the metal tube are sealed.

10. The suspension damper of claim 8 wherein the interior of the metal tube is injected with a plastic material.

11. The suspension damper of claim 8 wherein the interior of the metal tube is injected with an elastomeric material.

12. The suspension damper of claim 1 wherein the spring comprises an injection molded fiber reinforced plastic material.

13. The suspension damper of claim 12 wherein the fiber is of sufficient length to be uni-axially aligned along the flow direction of the plastic material.

14. The suspension damper of claim 1 wherein the disk is circular in shape and has an outer periphery defining an annular gap in conjunction with an inner wall of the tube for fluid flow therebetween.

15. The suspension damper of claim 1 wherein the spring has a specific gravity equal to or greater than the specific gravity of the fluid and the disk has a specific gravity that is sufficiently less than the specific gravity of the fluid such that the spring and the disk are floatable in the fluid.

16. A suspension damper comprising:

a tube;

a rod guide assembly closing one end of the tube;

a damping piston assembly disposed within the tube and slidably mounted therein for reciprocal movement in the tube, wherein the tube is substantially filled with a fluid having a specific gravity that damps the reciprocating movement of the damping piston assembly within the tube;

a piston rod connected to the damping piston assembly and extending through the tube and the rod guide assembly;

a rebound cut-off disk suspended in the tube between the rod guide assembly and the damping piston assembly and cooperating with the damping piston assembly to provide a rebound cut-off effect between the rebound cut-off disk and damping piston assembly; and a spring disposed between the rebound cut-off disk and the rod guide assembly, wherein the disk has a specific gravity that is less than the specific gravity of the fluid, whereby the disk is floatable in the fluid, wherein the disk comprises metal overmolded with a plastic material or an elastomeric material, wherein the disk is circular in shape and has an outer periphery defining an annular gap in conjunction with an inner wall of the tube for fluid flow therebetween, wherein the spring has a specific gravity that is less than the specific gravity of the fluid, whereby the spring is floatable in the fluid, and wherein the spring is conical in shape and the coils nest within each other, thereby having a minimum collapsed length of about one wire diameter.

17. The suspension damper of claim 16 wherein the fluid is a magneto-rheological (MR) fluid.

18. The suspension damper of claim 16 wherein the fluid is oil.

19. The suspension damper of claim 16 wherein the spring comprises a metal tube.

20. The suspension damper of claim 19 wherein the ends of the metal tube are sealed.

21. The suspension damper of claim 19 wherein the interior of the metal tube is injected with a plastic material.

22. The suspension damper of claim 19 wherein the interior of the metal tube is injected with an elastomeric material.

23. The suspension damper of claim 16 wherein the spring comprises an injection molded fiber reinforced plastic material.

24. The suspension damper of claim 23 wherein the fiber is of sufficient length to be uni-axially aligned along the flow direction of the plastic material.

25. The suspension damper of claim 16 wherein the spring has a specific gravity equal to or greater than the specific gravity of the fluid and the disk has a specific gravity that is sufficiently less than the specific, gravity of the fluid such that the spring and the disk are floatable in the fluid.

* * * * *